Jan. 7, 1941.　　　　　K. MAHNKE　　　　　2,228,083
MULTISPEED MOTOR CONTROL
Filed Aug. 18, 1939　　　3 Sheets-Sheet 1

WITNESSES:　　　　　　　　　　　INVENTOR
　　　　　　　　　　　　　　　　　Kurt Mahnke.
　　　　　　　　　　　　　　　　　BY
　　　　　　　　　　　　　　　　　Paul E. Friedemann
　　　　　　　　　　　　　　　　　ATTORNEY Jan. 7, 1941.  K. MAHNKE  2,228,083
MULTISPEED MOTOR CONTROL
Filed Aug. 18, 1939   3 Sheets-Sheet 2
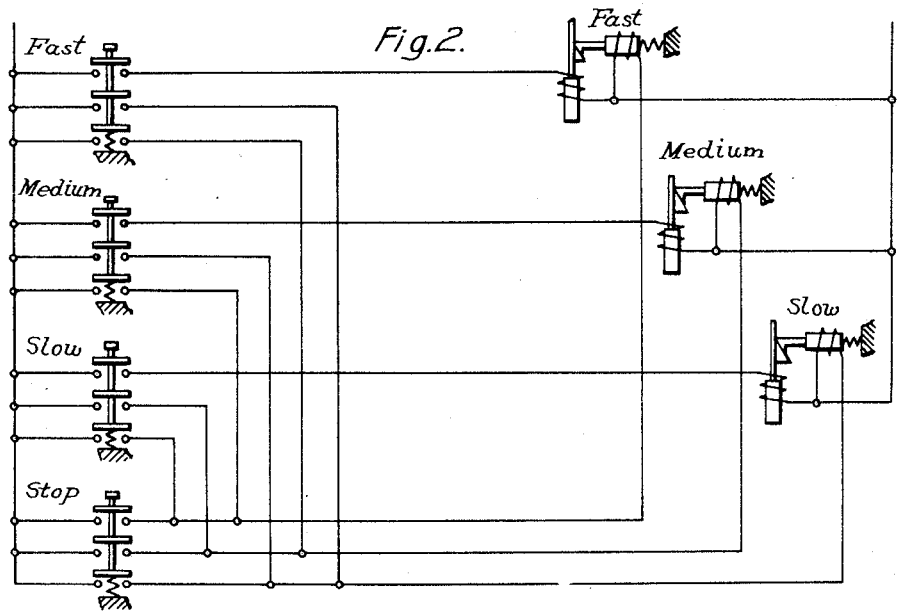
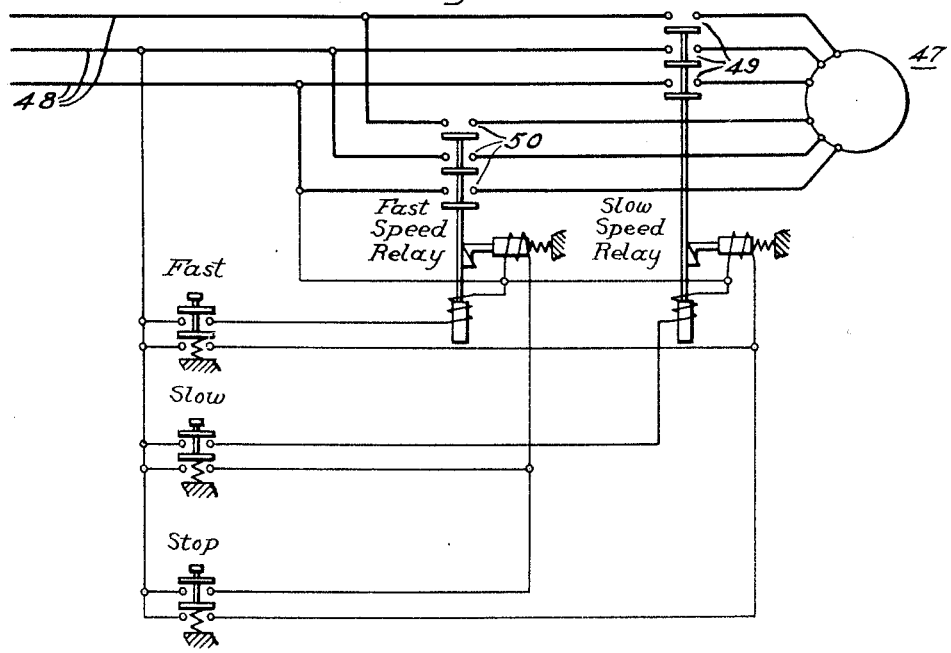
WITNESSES:
INVENTOR
Kurt Mahnke.
BY
Paul E. Friedemann
ATTORNEY Jan. 7, 1941.  K. MAHNKE  2,228,083
MULTISPEED MOTOR CONTROL
Filed Aug. 18, 1939  3 Sheets-Sheet 3

WITNESSES:

INVENTOR
Kurt Mahnke.
BY
Paul E. Friedemann
ATTORNEY

Patented Jan. 7, 1941

2,228,083

UNITED STATES PATENT OFFICE 2,228,083

MULTISPEED MOTOR CONTROL

Kurt Mahnke, Forest Hills, Pa., assignor to Westinghouse Electric & Manufacturing Company, East Pittsburgh, Pa., a corporation of Pennsylvania Application August 18, 1939, Serial No. 290,755

12 Claims. (Cl. 172—179)

My invention relates to a speed control system for an electric motor.

In control systems for various electrical apparatus, such as, for example, electric fans, it is usually desirable to incorporate a low voltage release feature so that after a predetermined voltage decrease or a voltage failure, the fan restarts automatically. In more recent control systems of this type, the tendency has been toward the use of pushbuttons for effecting speed control for the sake of safety and simplicity of operation rather than the use of rheostats, open switches, and the like.

An object of my invention is to provide a control system for an electric motor which incorporates a low voltage release and automatic restart feature.

Another object of my invention is to provide a control system for an electric motor having a plurality of selective speed pushbuttons of a specific type in which depression of any particular speed pushbutton will simultaneously effect tripping the relays associated with all of the other speed pushbuttons.

Another object of my invention is to provide a control system which is safe, simple, and reliable in operation and which is fully automatic.

Other objects and advantages will become more apparent from a study of the following specification when considered in conjunction with the accompanying drawings, in which:

Fig. 2 is a schematic showing of a pushbutton scheme wherein three selected speeds are shown;

Fig. 3 is a schematic showing of a modification of my invention as applied to an alternating current motor.

Figure 1:
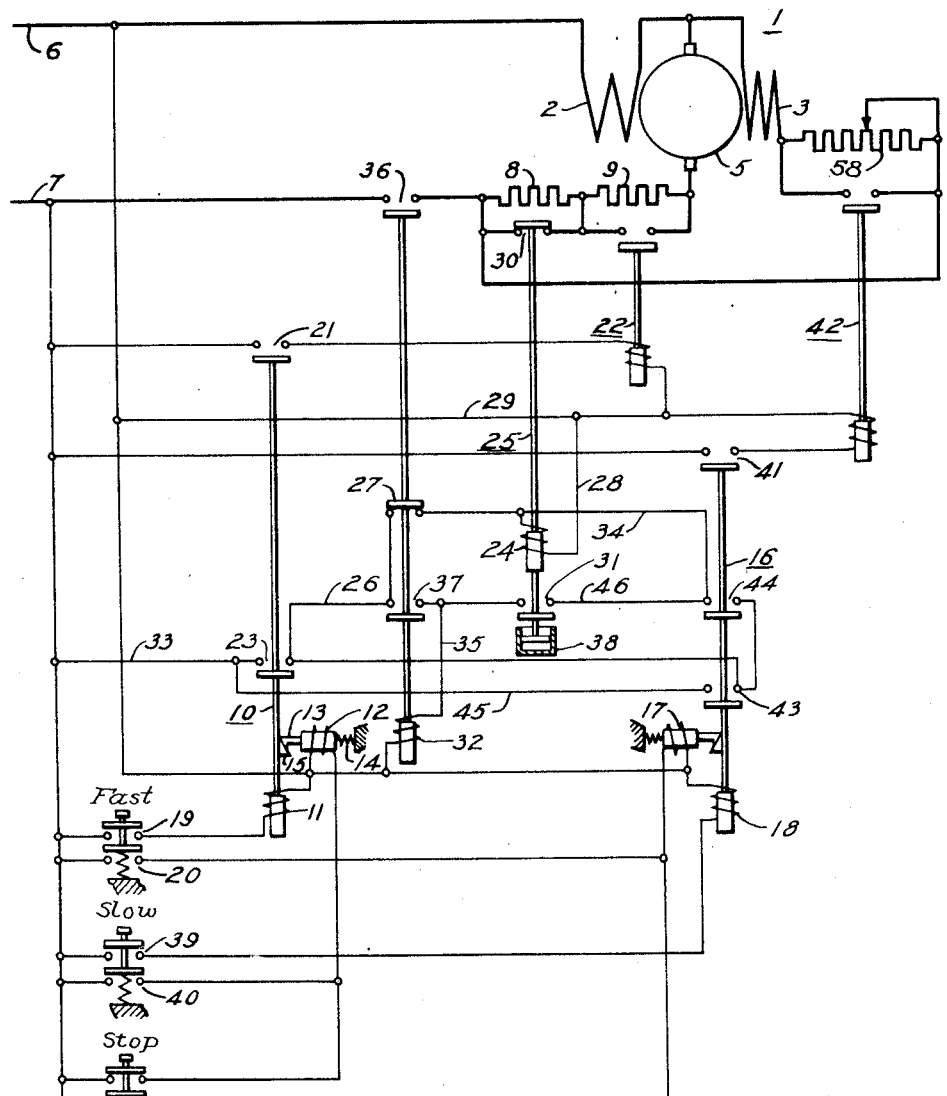
Figure 1 is a schematic showing of a direct current motor control system embodying the principles of my invention.

Referring more particularly to Fig. 1, 1 denotes a direct current motor having a series field winding 2, a shunt field winding 3, a shunt field resistor 58, and an armature 5, all of which are energizable by a direct current source of potential which is applied across buses 6 and 7. In series with the armature 5 and field winding 2 are resistors 8 and 9. "Fast," "Slow," and "Stop" pushbuttons of the spring release (or momentary contact) type are utilized to control the speed of the motor. Associated with the "Fast" speed pushbutton is a relay 10 including a main energizing coil 11 and a trip coil 12. The armature of the trip coil 12 has a latch 13 which is biased in one direction by spring 14. Cooperating with the latch 13 is a wedge-shaped member 15. It will thus be seen that upon energization of main energizing coil 11 which effects upward movement of the plunger of relay 10 and the wedge-shaped member 15, spring 14 will bias latch 13 in such a way as to support member 15 from its lowermost surface, thereby latching relay 10 in its upward or energized position. Subsequent deenergization of coil 11 due to releasing of the "Fast" speed pushbutton will thus have no effect on the position of the relay 10. However, if trip coil 12 is energized thereby effecting retraction of latch member 13, the relay 10 will be allowed to assume its deenergized position, that is, the plunger will be allowed to fall by gravity. Associated with the "Slow" speed pushbutton is a similar relay 16 having the same type spring applied magnetic released latch including trip coil 17 and main energizing coil 18.

The operation of the device is as follows: Assume that the motor is at a standstill and that it is desired to operate it at fast speed. The attendant depresses the "Fast" speed pushbutton. Closure of the upper contact members 19 thereof establishes a circuit from bus 7, through the contact members 19, the main coil 11 to bus 6, thereby effecting operation of relay 10 and the latching thereof in its upper position. Closure of the lower contact members 20 of the "Fast" speed pushbutton completes another energizing circuit through trip coil 17 of the slow speed relay 16 which will have no effect in this instance but which would have tripped relay 16, had relay 16 been previously energized.

While relay 10 is latched in its energized or upper position, it will complete a circuit through contact members 21 to effect energization of relay 22 which in turn will effect short circuiting of resistor 9. At the same time, closure of contact members 23 of relay 10 will complete a circuit through the actuating coil 24 of relay 25, which circuit may be traced from bus 7, through contact members 23, conductor 26, contact members 27, coil 24, conductors 28 and 29 to bus 6. Relay 25 is immediately actuable in its upper direction, hence, it will immediately open contact members 30, thereby inserting a resistor 8 in the main series circuit. Auxiliary contact members 31 of relay 25 simultaneously close, thereby completing a circuit through the low voltage release coil 32, which circuit may be traced from bus 7, through conductor 33, contact members 23, conductor 26, contact members 27, conductor 34, contact members 31, conductor 35, low voltage release coil 32, to the bus 6. Energization of coil 32 effects closing of the line contact members 36, thereby completing a main series circuit through the motor 1 and effecting starting of the motor. Energization of coil 32 also effects closing of contact members 37 (which bridge contact members 27) and effects opening of contact members 27, the latter interrupting the circuit through coil 24 allowing slow downward movement of the plunger of relay 25, the downward movement being retarded by a dashpot 38 or any other one-way (downwardly) acting time delay mechanism. After a definite time delay which is for the purpose of allowing motor 1 to come up to a definite speed, contact members 30 close and resistor 8 is shunted, therefore, full voltage is applied to the armature 5 and series field winding 2 while the shunt field is weakened due to resistor 58 in series therewith.

Assume that slow speed operation is desired. The attendant depresses the "Slow" speed pushbutton. Closure of the upper contact members 39 thereof effects completion of a circuit through the main coil 18 of the slow speed relay 16, and closure of the lower contact members 40 of the "Slow" speed pushbutton completes a circuit through the trip coil 12 of the fast speed relay 10. Tripping of relay 10 effects interruption of a circuit through relay 22, hence, reinsertion of resistor 9 in the main series circuit. On the other hand, energization of relay 16 effects closure of contact members 41 which in turn effect energization of field relay 42 which in turn effects shunting of the shunt field resistor 58. Simultaneously, contact members 43 complete a circuit through coil 24 of the time delay relay 25, thereby reinserting the resistor 8 in the circuit, hence, resistors 8 and 9 are now in the circuit. At the same time, contact members 44 close and complete the circuit through coil 32 which may be traced from bus 7, through conductors 33, conductor 45, contact members 43 and 44, conductor 46, contact members 31, conductor 35, coil 32, to bus 6. Energization of coil 32 effects closure of line contact 36 and starting of the motor at reduced voltage through resistors 8 and 9. Contact members 27, which is the break interlock, opens but remains bridged by contact members 37 so that coil 24 remains energized hence the motor continues to run at reduced voltage across its armature.

Assume that it is desired to stop the motor either while it is running fast or while it is running slow. Depression of the "Stop" pushbutton will complete circuits through trip coils 12 and 17 of both the fast speed relay 10 and the slow speed relay 16, respectively, hence opening up the respective speed connections, and will at the same time interrupt the circuit through coil 32 thereby opening line conductor 36.

In case of a predetermined drop in line voltage or in case failure of the power supply, coil 32 would become partially or entirely deenergized, thereby permitting opening of the line contact members 36, thus effecting stopping of the motor. However, either relay 10 or relay 16, depending upon which is in its latched-in position, will remain in such position despite the opening of line contact members 36. Therefore, upon recurrence of the full line supply voltage, coil 32 will again become fully energized and the motor will be automatically started and brought up to the speed corresponding to that of the previously latched-in relay, in the manner which has been described above.

Fig. 2 shows a development scheme of the interlocking pushbuttons in accordance with my invention as applied to a three-speed control system instead of a two-speed control system, as shown in Fig. 1. For the sake of simplicity, only the pushbuttons and the respective speed relays are shown. Upon inspection of Fig. 2, it will be readily observed that in order to obtain the additional speed, an extra pole must be added to each of the pushbuttons. Furthermore, it will be readily noted that upon depression of the "Fast" speed pushbutton, a circuit will be completed through the uppermost contact members to the main coil of the "Fast" speed relay, a second circuit will be completed through the middle contact members through the trip coil of the "Slow" speed relay, and a third circuit will be completed through the lowermost contact members through the trip coil of the "Medium" speed relay. Likewise, upon depression of the "Medium" speed pushbutton, the main coil of the "Medium" speed relay is energized and the trip coil of the remaining relays are energized. In like manner, again upon depression of the "Slow" speed pushbutton, the main coil of the "Slow" speed relay is energized and simultaneously, the trip coils of the "Fast" and "Medium" speed relays are energized. Upon depression of the "Stop" pushbutton all of the trip coils, namely that of the "Fast," "Medium" and "Slow" speed relays, are simultaneously energized, thereby interrupting all of the speed connections. By following the scheme just developed, it would be readily observed that for additional speeds, it is necessary merely to add an additional pole to each of the pushbuttons. It will be obvious that the various speed relays may either operate the resistances or windings of the motor directly or may operate them indirectly through other relays or the like.

Fig. 3 is a schematic showing of the modification of my invention as applied to an alternating current induction motor 47 fed from an alternating current source indicated by buses 48 which feed through the two parallel circuits, one going through the line contact members 49 and the other going through line contact members 50 through two separate speed windings of induction motors 47 or through a single winding having two separate connections for obtaining two different speeds (the latter scheme requiring shunting of one set of terminals while the other is on the line). The operation of the device shown in Fig. 3 will be readily obvious in view of the foregoing description.

Figure 4:
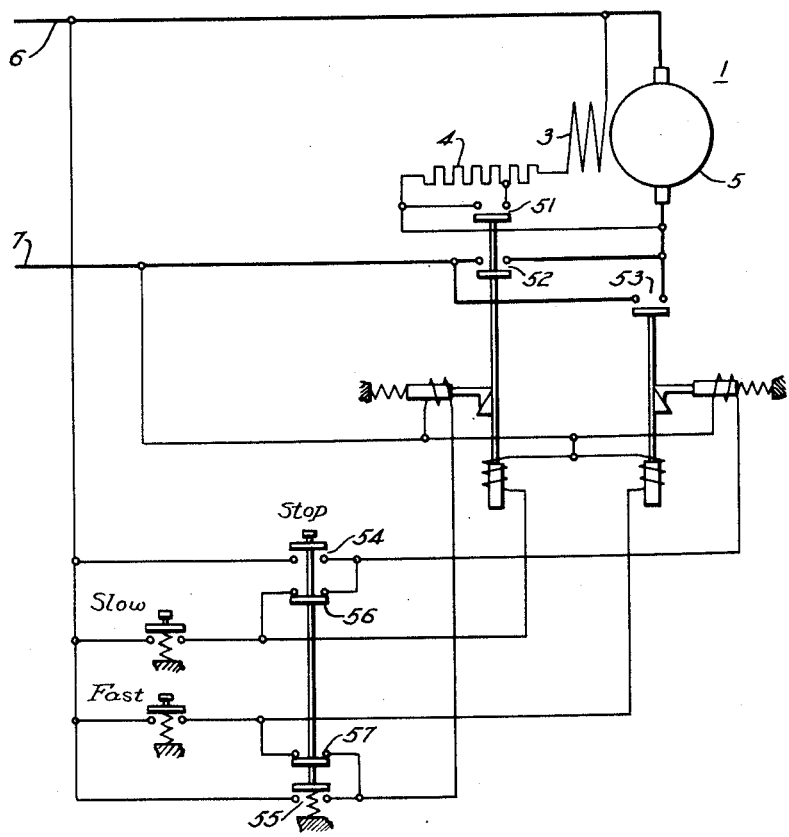
Fig. 4 is a schematic showing of a modification of Figure 1, showing a simplified scheme.

Fig. 4 shows a two-speed direct current system similar to Fig. 1 except that it is more simplified. The outstanding difference of the scheme shown in Fig. 4 with respect to that shown in Fig. 1 is that in Fig. 4, the "Slow" and "Fast" pushbuttons have a single pair of contact members and the "Stop" switch has four pairs of contact members whereas all of the pushbuttons in Fig. 1 have two pairs of contact members. Assume that the motor 1 is at a standstill and the "Slow" pushbutton is depressed thus completing an energizing circuit through the actuating coil of the "Slow" speed relay thereby effecting closing of contact members 51, thus shunting of a portion of the shunt field resistor 4 and effecting closing of the line contact members 52 to complete a circuit to the direct current source of supply 6—7. The motor will thus rotate and since its shunt field has a relatively high current, it will operate at reduced speed.

Now assume that the "Fast" speed pushbutton is depressed, thereby completing a circuit through the "Fast" speed relay operating coil effecting closing of line contact members 53 and at the same time completing a circuit through contact members 57 of the "Stop" pushbutton to the trip coil of the "Slow" speed relay therefore causing opening of contact members 51 and 52. The motor will thus become energized with the full value of resistor 4 in the shunt circuit hence the motor will run at fast speed. Assume now that it is desired to stop the motor and the "Stop" pushbutton is depressed. This will complete a circuit through contact members 54, the trip coils of the "Fast" and "Slow" speed relays, respectively, and through contact members 55 thereby effecting opening of line contact members 52 and 53 thus deenergizing and stopping the motor. The opening of contact members 53 and 56 precludes the possibility of completing the circuit through the actuating coils of the "Slow" and "Fast" speed relays respectively, when the "Stop" pushbutton is depressed.

While a single motor is shown, it is to be understood that my invention embraces multi-speed drives which consist of cascaded mechanically-coupled motors, each for one or more individual speeds.

Conventional protective devices such as overload coils and indicating lights have been omitted for the sake of simplicity, but it is understood that the inclusion of such devices is embraced within the scope of my invention.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In combination with an electric energizing source, an electric motor and a speed control system therefor including "Fast," "Slow," and "Stop" pushbuttons of the spring release type, a relay for each of said "Fast" and "Slow" pushbuttons, each relay having a main coil which is actuated by depression of its corresponding pushbutton to effect a particular motor speed connection corresponding to that indicated by the particular pushbutton, each relay also including a trip coil which trip coil is actuable by a pushbutton other than that corresponding to the particular relay.

2. In combination with an electric energizing source, an electric motor and a speed control system therefor including "Fast," "Slow," and "Stop" pushbuttons of the spring release type, a relay for each of said "Fast" and "Slow" pushbuttons, each relay having a main coil which is actuated by depression of its corresponding pushbutton to effect a particular motor speed connection corresponding to that indicated by the particular pushbutton, each relay also including a trip coil which trip coil is actuable by each of the pushbuttons except the pushbutton corresponding to the particular relay.

3. In combination with an electric energizing source, an electric motor and a speed control system therefor including "Fast," "Slow," and "Stop" pushbuttons of the spring release type, a relay for each of said "Fast" and "Slow" pushbuttons, each relay having a main coil which is actuated by depression of its corresponding pushbutton to effect a particular motor speed connection corresponding to that indicated by the particular pushbutton, each relay also including a spring applied, magnetic release type of latch including a trip coil for effecting magnetic release of said latch which trip coil is actuable by a pushbutton other than that corresponding to the particular relay.

4. In combination with an electric energizing source, an electric motor and a speed control system therefor including "Fast," "Slow," and "Stop" pushbuttons of the spring release type, a relay for each of said "Fast" and "Slow" pushbuttons, each relay having a main coil which is actuated by depression of its corresponding pushbutton to effect a particular motor speed connection corresponding to that indicated by the particular pushbutton, each relay also including a spring applied, magnetic release type of latch including a trip coil for effecting magnetic release of said latch which trip coil is actuable by each of the pushbuttons except the pushbutton corresponding to the particular relay.

5. In combination with an electric energizing source, an electric motor and a speed control system therefor including a plurality of speed control pushbuttons of the spring release type for effecting selective speed operation of said motor and a "Stop" pushbutton, each of said push-buttons having a plurality of poles, there being one pole for each speed control pushbutton, a plurality of relays, one for each of said speed control pushbuttons, each relay having a main coil which is energizable by depression of its corresponding pushbutton to effect a particular speed connection corresponding to that indicated by the particular pushbutton, each relay also including a trip coil which is actuable by each of the pushbuttons except the pushbutton corresponding to the particular relay, said "Stop" pushbutton upon depression, being effective to energize all the trip coils thereby effecting disconnection of all the speed connections.

6. In combination with an electric energizing source, an electric motor and a speed control system therefor including a plurality of speed control pushbuttons of the spring release type for effecting selective speed operation of said motor and a "Stop" pushbutton, each of said pushbuttons having a plurality of poles, there being one pole for each speed control pushbutton, a plurality of relays, one for each of said speed control pushbuttons, each relay having a main coil which is energizable by depression of its corresponding pushbutton to effect a particular speed connection corresponding to that indicated by the particular pushbutton, each relay also including a spring applied, magnetic release type of latch including a trip coil for effecting magnetic release of said latch which trip coil is actuable by a pushbutton other than that corresponding to the particular relay, said "Stop" pushbutton, upon depression, being effective to energize all the trip coils thereby effecting disconnection of all the speed connections.

7. In combination with a direct current source of potential, a direct current motor including an armature, a shunt field winding and a shunt field resistor, and a plurality of resistors connected in series with said armature and a speed control system including "Fast," "Slow," and "Stop" pushbuttons of the spring release type, a relay for each of said "Fast" and "Slow" pushbuttons, each relay having a main coil which is energizable by depression of its corresponding pushbutton and a biased latch for holding the relay in its energized position, the main coil of the relay corresponding to the "Slow" speed pushbutton being effective to cause short circuiting of said shunt field resistor while energization of the main coil relay corresponding to the "Fast" speed being effective to short circuit one of said series connected resistors each of said relays also including a trip coil which is energizable by each of said pushbuttons except the pushbutton corresponding to the particular relay, thereby effecting tripping of all relays except the particular relay corresponding to the pushbutton, said "Stop" pushbutton being effective to complete a circuit through all of said trip coils, thereby effecting tripping of all relays.

8. In combination with a direct current source of potential, a direct current motor including an armature, a shunt field winding and a shunt field resistor, and a plurality of resistors connected in series with said armature and a speed control system including "Fast," "Slow," and "Stop" pushbuttons of the spring release type, a relay for each of said "Fast" and "Slow" pushbuttons, each relay having a main coil which is energizable by depression of its corresponding pushbutton and a biased latch for holding the relay in its energized position, the main coil of the relay corresponding to the "Slow" speed pushbutton being effective to cause short circuiting of said shunt field resistor while energization of the main coil relay corresponding to the "Fast" speed being effective to short circuit one of said series connected resistors, each of said relays also including a trip coil which is energizable by each of said pushbuttons except the pushbutton corresponding to the particular relay, thereby effecting tripping of all relays except the particular relay corresponding to the pushbutton, said "Stop" pushbutton being effective to complete a circuit through all of said trip coils, thereby effecting tripping of all relays, a time delay relay which is actuable by said "Fast" speed pushbutton to effect immediate insertion of another of said series connected resistances in the main series circuit to afford reduced voltage starting and after a definite time interval to effect short circuiting of said last mentioned resistance to afford increased voltage for "Fast" running operation of said motor.

9. In combination with a direct current source of potential, a direct current motor including an armature, a shunt field winding and a shunt field resistor, and a plurality of resistors connected in series with said armature and a speed control system including "Fast," "Slow," and "Stop" pushbuttons of the spring release type, a relay for each of said "Fast" and "Slow" pushbuttons, each relay having a main coil which is energizable by depression of its corresponding pushbutton and a biased latch for holding the relay in its energized position, the main coil of the relay corresponding to the "Slow" speed pushbutton being effective to cause short circuiting of said shunt field resistor while energization of the main coil relay corresponding to the "Fast" speed being effective to short circuit one of said series connected resistors each of said relays also including a trip coil which is energizable by each of said pushbuttons except the pushbutton corresponding to the particular relay, thereby effecting tripping of all relays except the particular relay corresponding to the pushbutton, said "Stop" pushbutton being effective to complete a circuit through all of said trip coils, thereby effecting tripping of all relays, a line contactor which is maintained closed by a low voltage relay coil and which is opened upon occurrence of low voltage or line failure thereby interrupting the main series circuit, said "speed" relays, thereafter, by virtue of their latched-in feature being effective, upon recurrence of full line voltage, to automatically restart said motor and accelerate it up to a speed corresponding to that of the particular latched-in relay.

10. In combination with a direct current source of potential, a direct current motor including an armature, a shunt field winding and a shunt field resistor, and a plurality of resistors connected in series with said armature and a speed control system including "Fast," "Slow," and "Stop" pushbuttons of the spring release type, a relay for each of said "Fast" and "Slow" pushbuttons, each relay having a main coil which is energizable by depression of its corresponding pushbutton and a biased latch for holding the relay in its energized position, the main coil of the relay corresponding to the "Slow" speed pushbutton being effective to cause short circuiting of said shunt field resistor while energization of the main coil relay corresponding to the "Fast" speed being effective to short circuit one of said series connected resistors, each of said relays also including a trip coil which is energizable by each of said pushbuttons except the pushbutton corresponding to the particular relay, thereby effecting tripping of all relays except the particular relay corresponding to the pushbutton, said "Stop" pushbutton being effective to complete a circuit through all of said trip coils, thereby effecting tripping of all relays, a time delay relay which is actuable by said "Fast" speed pushbutton to effect immediate insertion of another of said series connected resistances in the main series circuit to afford reduced voltage starting and after a definite time interval to effect short circuiting of said last mentioned resistance to afford increased voltage for "Fast" running operation of said motor, a line contactor which is maintained closed by a low voltage relay coil and which is opened upon occurrence of low voltage or line failure thereby interrupting the main series circuit, said "speed" relays, thereafter, by virtue of their latched-in feature being effective, upon recurrence of full line voltage, to automatically restart said motor and accelerate it up to a speed corresponding to that of the particular latched-in relay.

11. In combination with an alternating current source of potential, an alternating current motor having a "Slow" speed winding and a "Fast" speed winding, a relay including a contactor for each of said windings, each of said relays including a main coil which, upon energization, effects closing of the respective contactor so as to complete an energizing circuit to the particular speed winding from the alternating source of potential, each of said relays also including a latch and a trip coil which, upon energization unlatches said latch, a plurality of pushbuttons of the spring release type including a "Slow," "Fast," and "Stop" pushbutton, the "Slow" speed pushbutton, upon depression, being effective to energize the main coil of the "Slow" speed relay and being effective to energize the trip coil of the "Fast" speed relay, the "Fast" speed pushbutton being effective to energize the main coil of the "Fast" speed relay, and to energize the trip coil of the "Slow" speed relay, the "Stop" pushbutton being effective to energize the trip coils of both the "Slow" and "Fast" speed relays.

12. In combination with an alternating current source of potential, an alternating current motor having a "Slow" speed winding and a "Fast" speed winding, a relay including a contactor for each of said windings, each of said relays including a main coil which, upon energization, effects closing of the respective contactor so as to complete an energizing circuit to the particular speed winding from the alternating source of potential, each of said relays also including a spring-applied, magnetic-release type of latch including a trip coil which, upon energization unlatches said latch, a plurality of pushbuttons of the spring-release type including a "Slow," "Fast" and "Stop" pushbutton, the "Slow" speed pushbutton, upon depression, being effective to energize the main coil of the "Slow" speed relay and being effective to energize the trip coil of the "Fast" speed relay, the "Fast" speed pushbutton being effective to energize the main coil of the "Fast" speed relay and to energize the trip coil of the "Slow" speed relay, the "Stop" pushbutton being effective to energize the trip coils of both the "Slow" and "Fast" speed relays.

KURT MAHNKE.